(12) United States Patent
Mozaffari et al.

(10) Patent No.: US 12,225,413 B2
(45) Date of Patent: Feb. 11, 2025

(54) LONG TERM EVOLUTION-M RESOURCE RESERVATION USING BITMAP

(71) Applicant: Telefonaktiebolaget LM Ericsson (publ), Stockholm (SE)

(72) Inventors: Mohammad Mozaffari, Fremont, CA (US); Johan Bergman, Stockholm (SE); Anders Wallén, Ystad (SE); Mattias Frenne, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 422 days.

(21) Appl. No.: 17/630,778

(22) PCT Filed: Aug. 13, 2020

(86) PCT No.: PCT/SE2020/050780
§ 371 (c)(1),
(2) Date: Jan. 27, 2022

(87) PCT Pub. No.: WO2021/029817
PCT Pub. Date: Feb. 18, 2021

(65) Prior Publication Data
US 2022/0272583 A1    Aug. 25, 2022

Related U.S. Application Data

(60) Provisional application No. 62/887,328, filed on Aug. 15, 2019.

(51) Int. Cl.
*H04W 28/26* (2009.01)
*H04L 1/1607* (2023.01)
(Continued)

(52) U.S. Cl.
CPC .......... *H04W 28/26* (2013.01); *H04L 1/1614* (2013.01); *H04W 72/0446* (2013.01); *H04W 72/0453* (2013.01)

(58) Field of Classification Search
CPC ............. H04W 72/0453; H04W 28/26; H04W 72/0446; H04W 16/14; H04W 72/23; H04W 4/70; H04W 88/10; H04L 1/1614
See application file for complete search history.

(56) References Cited

U.S. PATENT DOCUMENTS

2008/0062178 A1* 3/2008 Khandekar ........... H04L 67/306
345/440
2017/0347351 A1* 11/2017 Cai ....................... H04L 5/0064
(Continued)

OTHER PUBLICATIONS

International Seach Report and Written Opinion dated Oct. 5, 2020 for International Application No. PCT/SE2020/050780 filed Aug. 13, 2020, consisting of 16-pages.
(Continued)

*Primary Examiner* — Chi Ho A Lee
(74) *Attorney, Agent, or Firm* — Sage Patent Group

(57) ABSTRACT

A method and network node for flexible indication of resources in LTE-M using bitmaps are disclosed. According to one aspect, a method includes indicating to the wireless device a set of reserved resources for machine communications in compatibility with a broadband radio access technology sharing resources in a time frame and frequency band that encompasses the set of reserved resources, the indicating using a two level bitmap operating in the time-domain, a first bitmap level of the two level bitmap indicating a first set of subframes containing reserved resources, and a second bitmap level of the two level bitmap indicating reserved symbols within an indicated subframe.

20 Claims, 10 Drawing Sheets

(51) Int. Cl.
*H04W 72/0446* (2023.01)
*H04W 72/0453* (2023.01)

(56) References Cited

U.S. PATENT DOCUMENTS

| | | | |
|---|---|---|---|
| 2018/0206251 A1* | 7/2018 | Chen | H04W 72/04 |
| 2018/0359772 A1* | 12/2018 | Park | H04W 72/1268 |
| 2019/0327760 A1* | 10/2019 | Holfeld | H04W 72/23 |
| 2019/0372719 A1* | 12/2019 | Talarico | H04L 1/189 |
| 2020/0037292 A1* | 1/2020 | Oh | H04W 72/23 |
| 2020/0160526 A1* | 5/2020 | Ishikawa | G06T 7/0016 |
| 2021/0410084 A1* | 12/2021 | Li | H04W 52/265 |
| 2022/0159701 A1* | 5/2022 | Islam | H04L 5/0053 |
| 2022/0345270 A1* | 10/2022 | Mozaffari | H04L 27/26025 |

OTHER PUBLICATIONS

3GPP TSG RAN1#91 R1-1720464; Title: Rate matching resources for compatibility with efeMTC / NB-IoT; Agenda Item: 7.3.5; Source: Sony; Document for: Discussion / decision; Location and Date: Reno Nevada, USA, Nov. 27-Dec. 1, 2017, consisting of 6 pages.

3GPP TS 38.331 V15.6.0; 3rd Generation Partnership Project; Technical Specification Group Radio Access Network; NR; Radio Resource Control (RRC) protocol specification (Release 15); Jun. 2019, consisting of 519 pages.

3GPP TSG RAN WG1 Meeting #99 R1-1911833; Title: Coexistence of LTE-MTC with NR; Agenda Item: 6.2.1.4; Source: Ericsson; Document for: Discussion and Decision; Location and Date: Reno Nevada, USA, Nov. 18-22, 2019, consisting of 12 pages.

3GPP TSG-RAN WG1 Meeting #99 R1-1913594; Title: RAN1 agreements for Rel-16 Additional MTC Enhancements for LTE; Agenda Item: 6.2.1; Source: WI rapporteur (Ericsson); Document for: Information; Location and Date: Reno Nevada, USA, Nov. 18-22, 2019, consisting of 56 pages.

3GPP TSG RAN WG1 Meeting #98 R1-1908021; Title: Coexistence of LTE-MTC with NR; Agenda Item: 6.2.1.4; Source: Ericsson; Document for: Discussion and Decision; Location and Date: Prague, CZ, Aug. 26-30, 2019, consisting of 12 pages.

3GPP TS 36.331 V16.1.1; 3rd Generation Partnership Project; Technical Specification Group Radio Access Network; Evolved Universal Terrestrial Radio Access (E-UTRA); Radio Resource Control (RRC); Protocol specification (Release 16); Jul. 2020, consisting of 1078 pages.

3GPP TSG RAN WG1 Meeting #98 R1-1908030; Title: Coexistence of NB-IoT with NR; Agenda Item: 6.2.2.4; Source: Ericsson; Document for: Discussion and Decision; Location and Date: Prague, CZ, Aug. 26-30, 2019, consisting of 11 pages.

3GPP TSG RAN WG1 Meeting #97 R1-1905959; Title: Coexistence of LTE-MTC with NR; Agenda Item: 6.2.1.4; Source: Ericsson; Document for: Discussion and Decision; Location and Date: Reno Nevada, USA, May 13-17, 2019, consisting of 13 pages.

3GPP TSG RAN Meeting #84 RP-191356 (revision of RP-190770); Title: Revised WID: Additional MTC enhancements for LTE; Source: Ericsson; Document for: Approval; Agenda Item: 10.2.1; Location and Date: Newport Beach, USA, Jun. 3-6, 2019, consisting of 5 pages.

* cited by examiner

FIG. 2

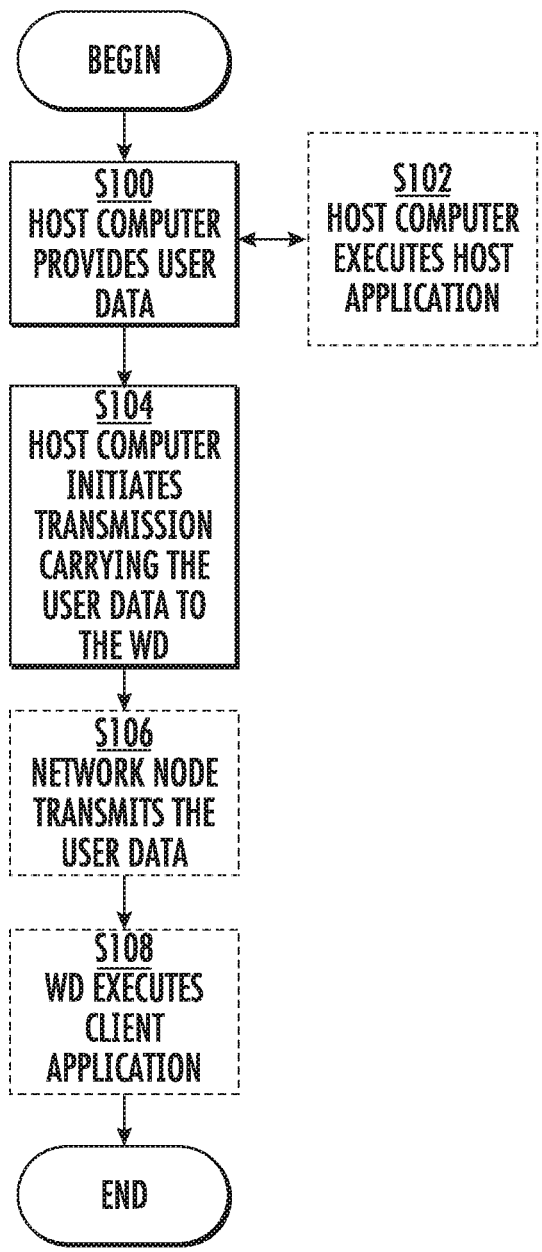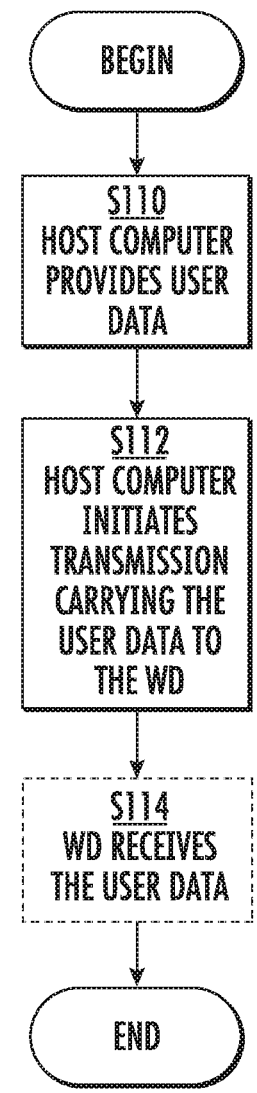
FIG. 6
FIG. 7

LONG TERM EVOLUTION-M RESOURCE RESERVATION USING BITMAP

CROSS-REFERENCE TO RELATED APPLICATIONS

This application is a Submission Under 35 U.S.C. § 371 for U.S. National Stage Patent Application of International Application No. PCT/SE2020/050780, filed Aug. 13, 2020 entitled "LONG TERM EVOLUTION-M RESOURCE RESERVATION USING BITMAP," which claims priority to U.S. Provisional Application No. 62/887,328, filed Aug. 15, 2019, entitled "LONG TERM EVOLUTION-M RESOURCE RESERVATION USING BITMAP," the entireties of both of which are incorporated herein by reference.

FIELD

The present disclosure relates to wireless communications, and in particular, to Long term Evolution-Machine type (LTE-M) resource reservation using a bitmap.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

Machine-type communications are widely used in many applications such as vehicle tracking, user and home security, banking, remote monitoring and smart grids. According to some reports, by 2023 there will be 3.5 billion wide-area devices connected to cellular networks. In this regard, LTE-M (also referred to as LTE-Machine Type Communications (LTE-MTC), or eMTC) networks are being rolled out at a fast pace, and it is foreseen that in the next few years, a massive number of devices will be connected to the networks, addressing a wide spectrum of LTE-M use cases. Thanks to a design that enables 10-year battery lifetime of LTE-M devices, many of these devices will remain in service years after deployment. During the lifetime of these deployed LTE-M devices, many networks will undergo LTE to NR migration. A smooth migration without causing service interruption to the deployed LTE-M devices is desirable to mobile network operators (MNO). Furthermore, a migration solution that ensures superior radio resource utilization efficiency and superior coexistence performance between LTE-M and NR is highly desirable. FIG. 1 is a diagram showing NR and LTE-M coexistence.

NR resources in the frequency and time domains can be configured for embedding LTE-M inside an NR carrier. In the frequency domain, LTE-M specific physical signals and channels are transmitted within so called narrow bands. A narrow band may span over six Physical Resource Blocks (PRBs) where each PRB consists of 12 subcarriers.

To ensure an efficient coexistence between NR and LTE-M, it may be desirable to avoid collision between NR and LTE-M key transmissions and protecting specific signals/channels, such as NR Control Resource Set (CORESET), synchronization signal block (SSB), LTE-M cell specific reference signal (CRS), primary synchronization signal (PSS) and secondary synchronization signal (SSS). Moreover, while avoiding collision between NR and LTE-M transmissions, resource efficiency should be considered in the coexistence scenario.

NR Resource Reservation

In NR, the concept of reserved resources was introduced to, among other benefits, facilitate forward compatibility and future radio interface extensions. These reserved resources, which are not used by NR-compatible wireless devices (WDs), can also be utilized to facilitate the coexistence of NR and LTE-M. "Not used" means that an NR physical downlink shared channel (PDSCH) transmission is not mapped to resource elements that are reserved. As these reserved resources are known to the NR WD, the WD knows which resource elements are used for PDSCH and which are not for correct de-mapping. Resource reservation in NR exists on two levels, the resource block (RB) level and the resource element (RE) level. On the RB level, a reserved resource consists of all subcarrier in an indicated resource block in the frequency domain and for all or a subset of the symbols in the time slot. On RE level, certain individual resource elements in an RB and slot are indicated as reserved.

A flexible way to configure RB level resource reservation in the frequency domain is to use a bit map (bit stream) where each bit represents a resource block (RB). In NR, bitmap 1 (RBs in the frequency domain) and bitmap 2 (symbols in the time domain) are used to reserve resources in the frequency and time domains, respectively. Hence, the resource reservation in NR is two dimensional. See FIG. 2 for an example of the use of bitmap 1 and 2, using RB level resource reservation to reserve the REs of one RB and one OFDM symbol. The darkened area in FIG. 2 is the reserved region.

An NR reserved resource configuration is needed to support LTE-M embedding on the same carrier being used by NR, i.e., to protect LTE-M signals from NR PDSCH transmission. To this end, a set of NR resources can be reserved for non-dynamically scheduled LTE-M transmissions. In particular, resources should be reserved for at least these LTE signals, and in particular for this use case, these LTE-M signals:
   PSS (Primary Synchronization Signal), and SSS (Secondary Synchronization Signal) used by LTE/LTE-M WD for cell search procedure;
   CRS (Cell-specific Reference signal) used by LTE/LTE-M WD for channel estimation, cell selection, and coherent demodulation;
   PBCH (Physical Broadcast Channel) that carries system information (i.e., master information block (MIB)) for LTE/LTE-M WD requiring to access the network; and/or
   SIB1-BR (SystemInformationBlockType1) contents assist the LTE-M WD when it is evaluating cell access and also defines the scheduling of other system information.

Valid/invalid LTE-M subframes: LTE-M resource reservation

In LTE-M, the principle of resource reservation also exists, where a cell-specific subframe bitmap can be broadcasted by the eNB to WDs, in order to declare valid downlink subframes for LTE-M subframes. Hence, the resource reservation is one dimensional, either a subframe is valid or invalid (i.e., reserved). In this case, the bitmap length of 10 or 40 bits are used to determine valid/invalid subframes within 1 or 4 frames (a frame is 10 subframes).

For instance, an LTE-M network can indicate to an LTE-M WD, the subframes which are used for Positioning Reference Signal (PRS) or Multimedia Broadcast Multicast Service Single Frequency Network (MBSFN) transmissions as invalid for LTE-M subframes.

When LTE-M coexists with NR as in dynamic spectrum sharing (DSS), there may be several cases where it would be beneficial if the LTE-M system avoids transmitting on resources that are desired to be used by an NR system. In some cases, it is enough to handle this by having the LTE-M and NR schedulers divide the resources on a PRB and subframe/slot/symbol level, but in some cases, it may also be useful if LTE-M and NR transmission can coexist within the same PRBs. In this regard, valid and invalid LTE-M subframes can additionally be configured to protect various essential NR signals and channels. In particular, the following NR signals/channels need to be protected:

CORESET (Control Resource Set) where NR PDCCH is located;

The SS/PBCH block (sometimes referred to as SSB) which consists of synchronization signals (PSS and SSS), PBCH and PBCH DM-RS;

TRS (Tracking Reference Signal) which is a CSI-RS resource set configured to be used for fine synchronization and channel analysis; and CSI-RS (Channel State Information Reference Signal) to be used for CSI measurements.

Clearly, valid/invalid LTE-M subframes can be useful to avoid collision between NR and LTE-M. FIG. 3 shows valid/invalid LTE-M subframes.

It should again be noted that invalid LTE-M subframe configurations can be considered as subframe-level LTE-M resource reservations. Here, the focus is on the LTE-M resource reservation. Note that reserved resources in LTE-M are not used for LTE-M transmissions and can be dedicated to NR signals and channels.

In the existing subframe-level LTE-M resource reservations, LTE-M transmissions are not allowed in the entire invalid LTE-M subframe(s). This, however, degrades the coexistence performance in terms of resource utilization. Considering the time-domain structure of NR signals and channels, it can be seen that they only occupy few OFDM symbols thus if such subframe is reserved for NR transmission, the rest of the reserved LTE-M subframe will be wasted as LTE-M transmission cannot take place there.

For example, SSB spans over 4 orthogonal frequency division multiplexed (OFDM) symbols, and the CORESET can occupy one, two, or three symbols within an NR slot (i.e., one subframe in 15 kHz SCS case). Similarly, channel state information reference signals (CSI-RS) and tracking reference signal (TRS) can occupy only few symbols of a slot (typically one or two). As can be seen, subframe-level LTE-M resource reservation is not efficient from resource utilization point of view.

In this case, one promising approach is to consider a finer granularity for reserving LTE-M resources in the time domain. In particular, slot-level and/or symbol-level resource reservation can be introduced in LTE-M. Having a finer resource reservation (e.g., slot-level or symbol-level) can have two advantages: 1) it improves the resource utilization in NR and LTE-M coexistence, and 2) it provides a flexibility that can facilitate the coexistence of NR URLLC services with LTE-M.

A problem exists as to how to achieve an efficient resource reservation scheme to properly configure LTE-M reserved resources.

SUMMARY

Some embodiments advantageously provide methods and network nodes for Long Term Evolution-Machine type (LTE-M) resource reservation using a bitmap.

Some embodiments provide an efficient LTE-M resource reservation scheme to ensure coexistence between NR and LTE-M systems with minimal waste of resources. According to some embodiments, a method is based on a two-level bitmap that allows reserving time-domain resources in LTE-M to prevent LTE-M transmissions in specific resources. To efficiently reserve LTE-M resources, in some embodiments, a two-level time domain bitmap solution leverages the existing bitmap-based valid/invalid subframes. In the two-level bitmap (bitmap 1 and bitmap 2) solution, the first bitmap indicates the subframes and the second bitmap shows the reserved symbols within those subframes identified by the first bitmap. Hence, partially valid subframes are introduced, where in some subframes, some symbols are valid.

Some embodiments can be used to effectively deploy LTE-M in coexistence with NR. With the LTE-M resource reservation scheme of some embodiments, signals and channels essential to NR are protected while maintaining LTE-M performance. In fact, some embodiments of a two-level bitmap-based resource reservation method in LTE-M has one or more of the following advantages: 1) some embodiments improve the resource utilization in NR and LTE-M coexistence, i.e., minimizes the amount of wasted (unused) resource elements; and 2) some embodiments provide a flexibility that can facilitate the coexistence of NR ultra reliable low latency communication (URLLC) services with LTE-M; 3) some embodiments have low overhead and implementation complexity by leveraging existing bitmap structure used for valid/invalid LTE-M subframes; and 4) some embodiments are backward compatible.

According to one aspect, a network node configured to communicate with a wireless device (WD) is provided. The network node includes processing circuitry configured to indicate to the wireless device a set of reserved resources for machine communications in compatibility with a broadband radio access technology sharing resources in a time frame and frequency band that encompasses the set of reserved resources, the indicating using a two level bitmap operating in the time-domain, a first bitmap level of the two level bitmap indicating a first set of subframes containing reserved resources, and a second bitmap level of the two level bitmap indicating reserved symbols within an indicated subframe.

According to this aspect, in some embodiments, the indicated reserved resources are not used for Long Term Evolution Machine Communications, LTE-M, transmissions. In some embodiments, resources not indicated as reserved resources may be used by for LTE-M transmissions. In some embodiments, the processing circuitry (68) is further configured to indicate to the wireless device a set resource blocks using a third bitmap, the third bitmap indicating for which resource blocks in frequency domain the time-domain resource reservation indicated by the two level bitmap applies. In some embodiments, the first bitmap level of the two level bitmap indicates whether a subframe is available or partially available for Long Term Evolution Machine Communications, LTE-M. In some embodiments, the broadband radio access technology is New Radio, NR. In some embodiments, a granularity of a resource reservation is based on an overhead of bitmaps. In some embodiments, the granularity is one of one symbol, two symbols, seven symbols and 14 symbols. In some embodiments, the processing circuitry is further configured to define multiple pairs of two-level bitmaps, within each pair, the first bitmap level of the two level bitmap indicating a subset of subframes and the second bitmap level of the two level bitmap indicating a granularity of resource reservation. In some embodiments, the second bitmap level of a first pair of two-level bitmaps is of indicates a resource reservation granularity that is different from a second bitmap level of a second pair of two-level bitmaps. In some embodiments, a first subset of subframes indicated by the first bitmap level of a first pair of two-level bitmaps and a second subset of frames indicated by the first bitmap level of a second pair of two-level bitmaps do not overlap. In some embodiments, the processing circuitry is further configured to introduce a third two-level bitmap configurable to make resources available outside the frequency band. In some embodiments, the processing circuitry is further configured to jointly encode a bitmap indicated by the first bitmap level of the two level bitmap with a bitmap indicating that a particular subframe indicated by the first bitmap level of the two level bitmap is fully valid, partially valid or invalid.

According to another aspect, a method in a network node configured to communicate with a wireless device (WD) is provided. The method includes indicating indicate to the wireless device a set of reserved resources for machine communications in compatibility with a broadband radio access technology sharing resources in a time frame and frequency band that encompasses the set of reserved resources, the indicating using a two level bitmap operating in the time-domain, a first bitmap level of the two level bitmap indicating a first set of subframes containing reserved resources, and a second bitmap level of the two level bitmap indicating reserved symbols within an indicated subframe.

According to this aspect, in some embodiments, the indicated reserved resources are not used for Long Term Evolution Machine Communications, LTE-M, transmissions. In some embodiments, resources not indicated as reserved resources may be used by for LTE-M transmissions. In some embodiments, the method further includes indicating to the wireless device a set resource blocks using a third bitmap, the third bitmap indicating for which resource blocks in frequency domain the time-domain resource reservation indicated by the two level bitmap applies. In some embodiments, the first bitmap level of the two level bitmap indicates whether a subframe is available or partially available for Long Term Evolution Machine Communications, LTE-M. In some embodiments, the broadband radio access technology is New Radio, NR. In some embodiments, a granularity of a resource reservation is based on an overhead of bitmaps. In some embodiments, the granularity is one of one symbol, two symbols, seven symbols and 14 symbols. In some embodiments, the method further includes defining multiple pairs of two-level bitmaps, within each pair, the first bitmap level of the two level bitmap indicating a subset of subframes and the second bitmap level of the two level bitmap indicating a granularity of resource reservation. In some embodiments, the second bitmap level of a first pair of two-level bitmaps is of indicates a resource reservation granularity that is different from a second bitmap level of a second pair of two-level bitmaps. In some embodiments, a first subset of subframes indicated by the first bitmap level of a first pair of two-level bitmaps and a second subset of frames indicated by the first bitmap level of a second pair of two-level bitmaps do not overlap. In some embodiments, the method includes introducing a third two-level bitmap configurable to make resources available outside the frequency band. In some embodiments, the method includes jointly encoding a bitmap indicated by the first bitmap level of the two level bitmap with a bitmap indicating that a particular subframe indicated by the first bitmap level of the two level bitmap is fully valid, partially valid or invalid.

According to another aspect, a WD, is configured to communicate with a network node. The wireless device includes processing circuitry configured to receive an indication from the network node, the indication indicating a set of reserved resources for machine communications in compatibility with a broadband radio access technology sharing resources in a time frame and frequency band that encompasses the set of reserved resources, the indicating using a two level bitmap, a first bitmap level of the two level bitmap indicating a first set of subframes containing reserved resources, and a second bitmap level of the two level bitmap indicating reserved symbols within an indicated subframe.

According to this aspect, in some embodiments, the indicated reserved resources are not used for Long Term Evolution Machine Communications, LTE-M, transmissions. In some embodiments, resources not indicated as reserved resources may be used by for LTE-M transmissions. In some embodiments, the first bitmap level of the two level bitmap indicates whether a subframe is available or partially available for Long Term Evolution Machine Communications, LTE-M. In some embodiments, the processing circuitry (68) is further configured to indicate to the wireless device a set resource blocks using a third bitmap, the third bitmap indicating for which resource blocks in frequency domain the time-domain resource reservation indicated by the two level bitmap applies. In some embodiments, a granularity of a resource reservation is based on an overhead of bitmaps. In some embodiments, the processing circuitry is further configured to define multiple pairs of two-level bitmaps, within each pair, the first bitmap level of the two level bitmap indicating a subset of subframes and the second bitmap level of the two level bitmap indicating a granularity of resource reservation. In some embodiments, the second bitmap level of a first pair of two-level bitmaps is of indicates a resource reservation granularity that is different from a second bitmap level of a second pair of two-level bitmaps. In some embodiments, a first subset of subframes indicated by the first bitmap level of a first pair of two-level bitmaps and a second subset of frames indicated by the first bitmap level of a second pair of two-level bitmaps do not overlap. In some embodiments, the processing circuitry is further configured to jointly encode a bitmap indicated by the first bitmap level of the two level bitmap with a bitmap indicating that a particular subframe indicated by the first bitmap level of the two level bitmap is fully valid, partially valid or invalid.

According to yet another aspect, a method in a WD includes receiving an indication from the network node, the indication indicating a set of reserved resources for machine communications in compatibility with a broadband radio access technology sharing resources in a time frame and frequency band that encompasses the set of reserved resources, the indicating using a two level bitmap, a first bitmap level of the two level bitmap indicating a first set of subframes containing reserved resources, and a second bitmap level of the two level bitmap indicating reserved symbols within an indicated subframe.

According to this aspect, in some embodiments, the indicated reserved resources are not used for Long Term Evolution Machine Communications, LTE-M, transmissions. In some embodiments, resources not indicated as reserved resources may be used by for LTE-M transmissions. In some embodiments, the first bitmap level of the two level bitmap indicates whether a subframe is available or partially available for Long Term Evolution Machine Communications, LTE-M. In some embodiments, the method further includes indicating to the wireless device a set resource blocks using a third bitmap, the third bitmap indicating for which resource blocks in frequency domain the time-domain resource reservation indicated by the two level bitmap applies. In some embodiments, a granularity of a resource reservation is based on an overhead of bitmaps. In some embodiments, the method includes defining multiple pairs of two-level bitmaps, within each pair, the first bitmap level of the two level bitmap indicating a subset of subframes and the second bitmap level of the two level bitmap indicating a granularity of resource reservation. In some embodiments, the second bitmap level of a first pair of two-level bitmaps is of indicates a resource reservation granularity that is different from a second bitmap level of a second pair of two-level bitmaps.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

Figure 2:
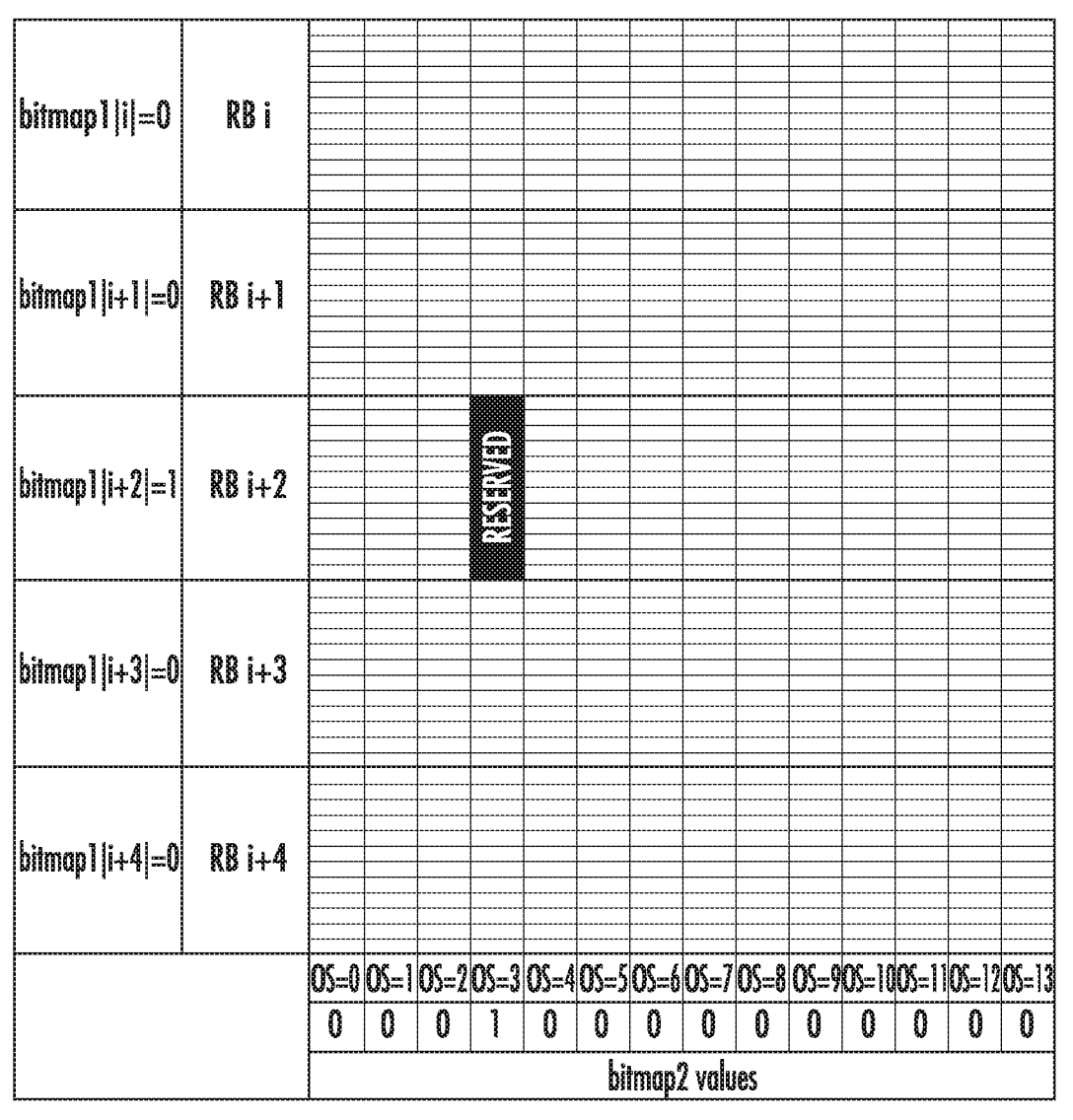

FIG. 2 shows an example of use of time and frequency domain resource reservation in NR using two bitmaps;

FIG. 6 is a flowchart illustrating exemplary methods implemented in a communication system including a host computer, a network node and a wireless device for executing a client application at a wireless device according to some embodiments of the present disclosure;

FIG. 7 is a flowchart illustrating exemplary methods implemented in a communication system including a host computer, a network node and a wireless device for receiving user data at a wireless device according to some embodiments of the present disclosure;

DETAILED DESCRIPTION

Figure 1:
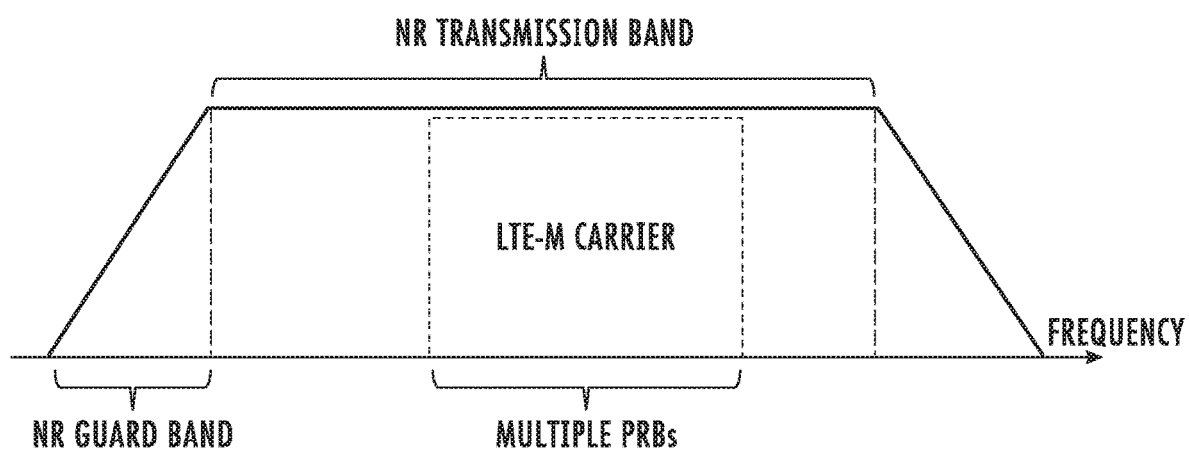
FIG. 1 illustrates New Radio and Long Term Evolution Machine type (LTE-M) coexistence.
Figure 3:
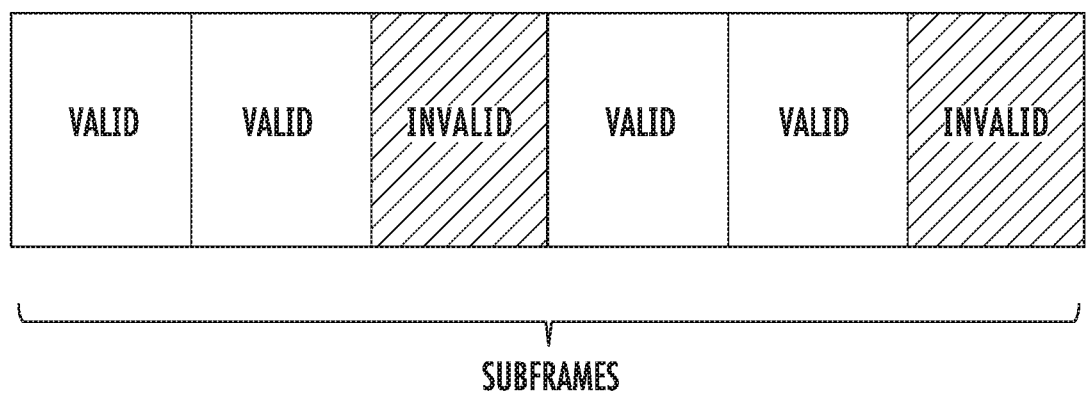
FIG. 3 shows valid/invalid LTE-M subframes.

Before describing in detail exemplary embodiments, it is noted that the embodiments reside primarily in combinations of apparatus components and processing steps related to Long term Evolution-Machine type (LTE-M) resource reservation using a bitmap. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A method and network node for flexible indication of resources in LTE-M using bitmaps are disclosed. According to one aspect, a method includes indicating a set of reserved LTE-M resources using a two-level bitmap, a first bitmap level indicating a first set of subframes and a second bitmap level indicating reserved symbols within an indicated subframe. It is noted that, although embodiments are described in which a network node establishes the reserved LTE-M resources, implementations are not limited to such. It is contemplated that other network elements, such as WDs could, in some embodiments, establish the reservation of the LTE-M resources. Thus, embodiments described with respect to a network node, could apply equally to a WD.

Figure 4:
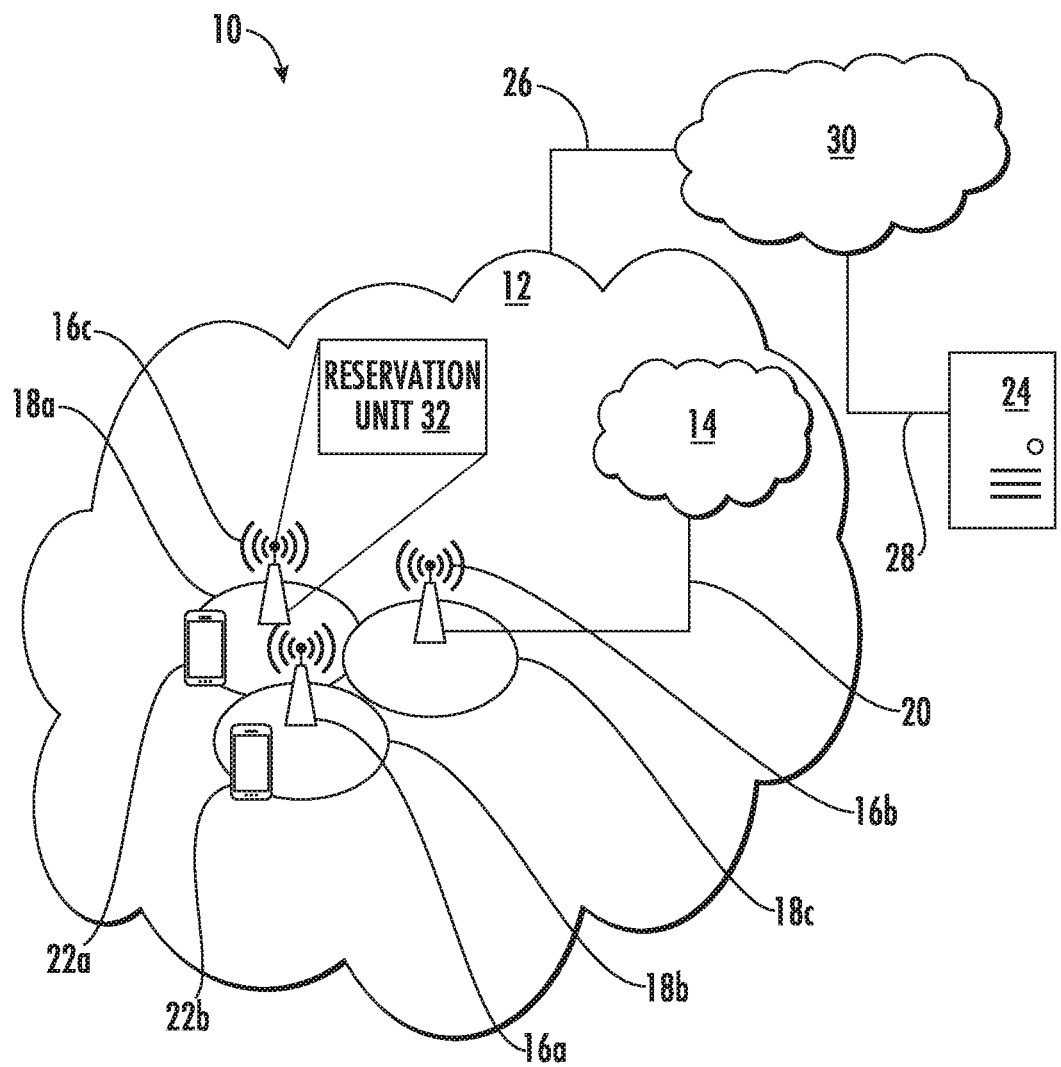
FIG. 4 is a schematic diagram of an exemplary network architecture illustrating a communication system connected via an intermediate network to a host computer according to the principles in the present disclosure.

Returning now to the drawing figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 4 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a reservation unit 32 which is configured to indicate a set of reserved Long Term Evolution-M (LTE-M), resources using a two level bitmap, a first bitmap level indicating a first set of subframes and a second bitmap level indicating reserved symbols within an indicated subframe.

Example implementations, in accordance with an embodiment, of the WD 22, network node 16 and host computer 24 discussed in the preceding paragraphs will now be described with reference to FIG. 5. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include reservation unit 32 configured to indicate a set of reserved Long Term Evolution-M (LTE-M), resources using a two level bitmap, a first bitmap level indicating a first set of subframes and a second bitmap level indicating reserved symbols within an indicated subframe.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 5:
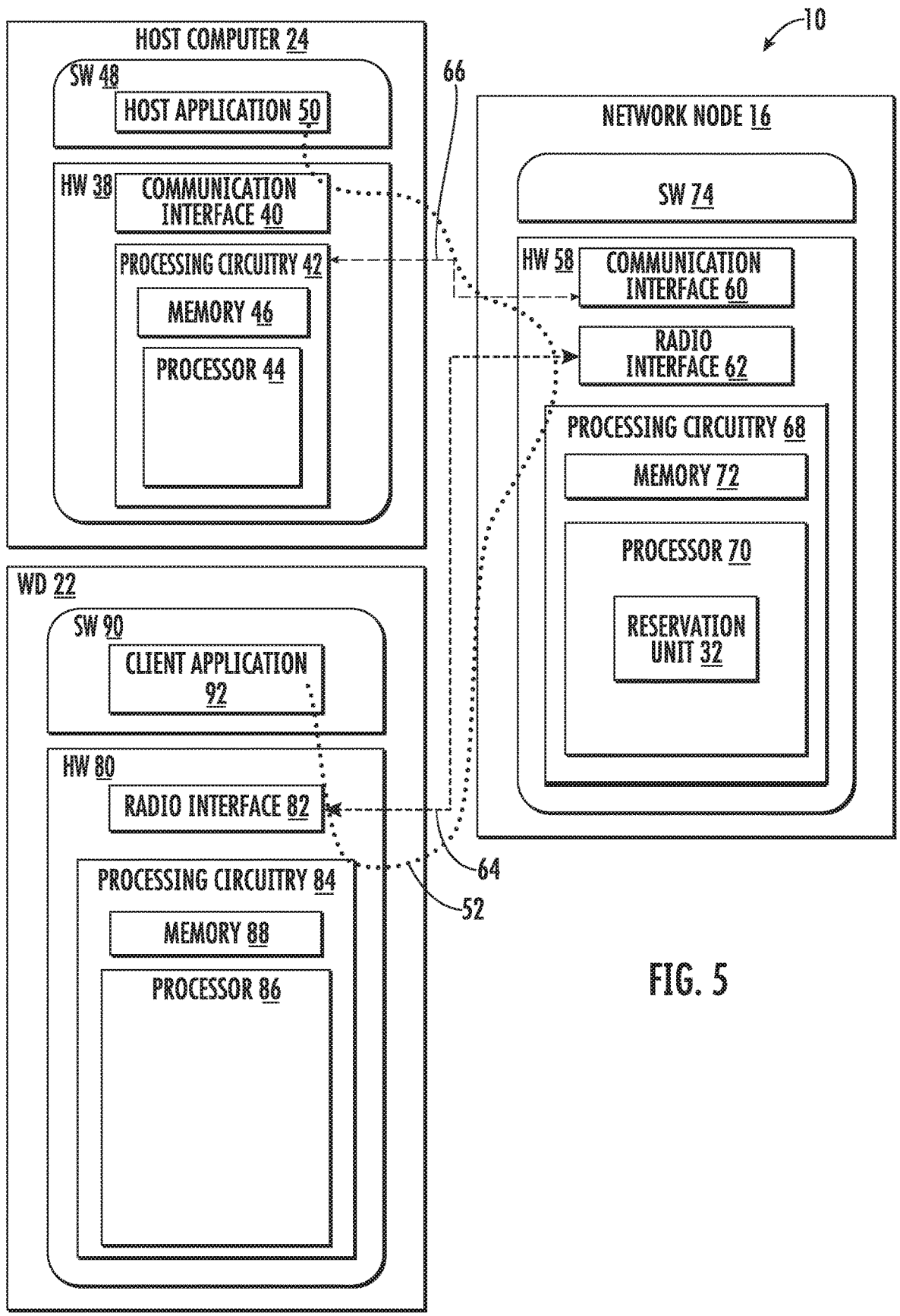
FIG. 5 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 5 and independently, the surrounding network topology may be that of FIG. 4.

In FIG. 5, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 4 and 5 show various "units" such as reservation unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 6 is a flowchart illustrating an exemplary method implemented in a communication system, such as, for example, the communication system of FIGS. 4 and 5, in accordance with one embodiment. The communication system may include a host computer 24, a network node 16 and a WD 22, which may be those described with reference to FIG. 5. In a first step of the method, the host computer 24 provides user data (Block S100). In an optional sub step of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 7 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In a first step of the method, the host computer 24 provides user data (Block S110). In an optional sub step (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 8:
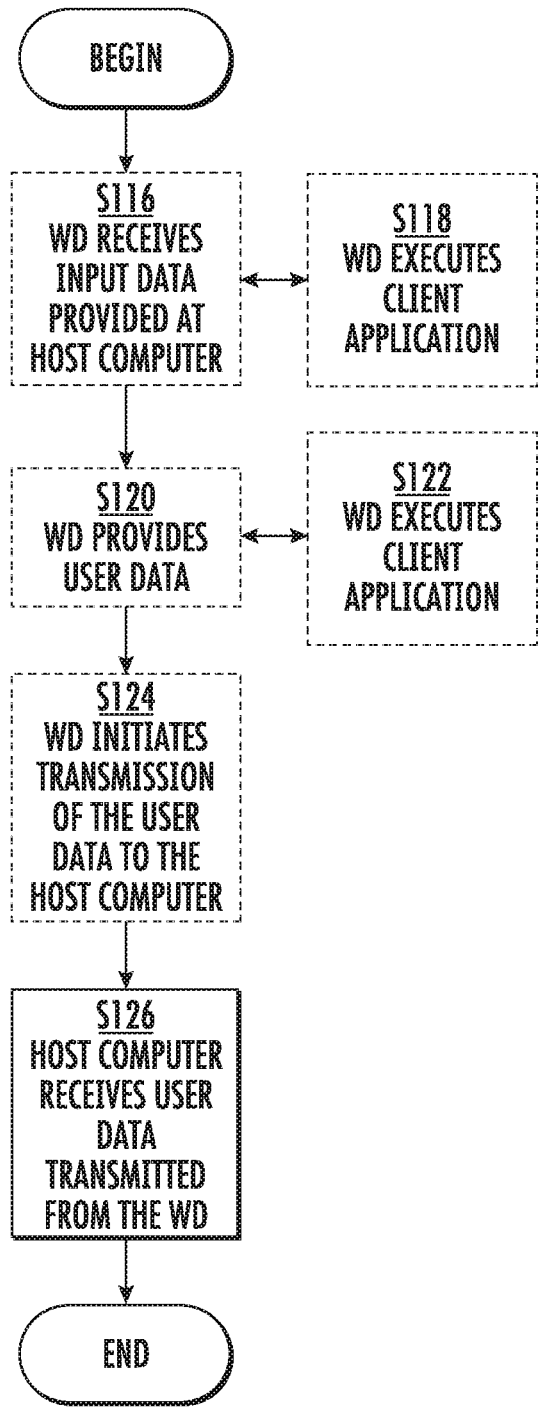
FIG. 8 is a flowchart illustrating exemplary methods implemented in a communication system including a host computer, a network node and a wireless device for receiving user data from the wireless device at a host computer according to some embodiments of the present disclosure.

FIG. 8 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, the WD 22 receives input data provided by the host computer 24 (Block S116). In an optional sub step of the first step, the WD 22 executes the client application 92, which provides the user data in reaction to the received input data provided by the host computer 24 (Block S118). Additionally, or alternatively, in an optional second step, the WD 22 provides user data (Block S120). In an optional sub step of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third sub step, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 9:
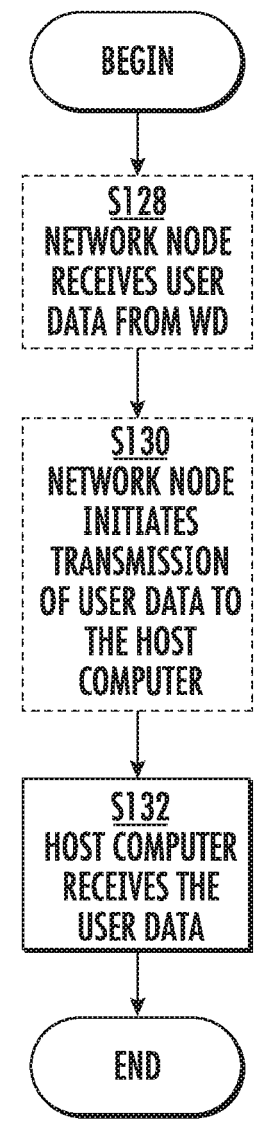
FIG. 9 is a flowchart illustrating exemplary methods implemented in a communication system including a host computer, a network node and a wireless device for receiving user data at a host computer according to some embodiments of the present disclosure.

FIG. 9 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 10:
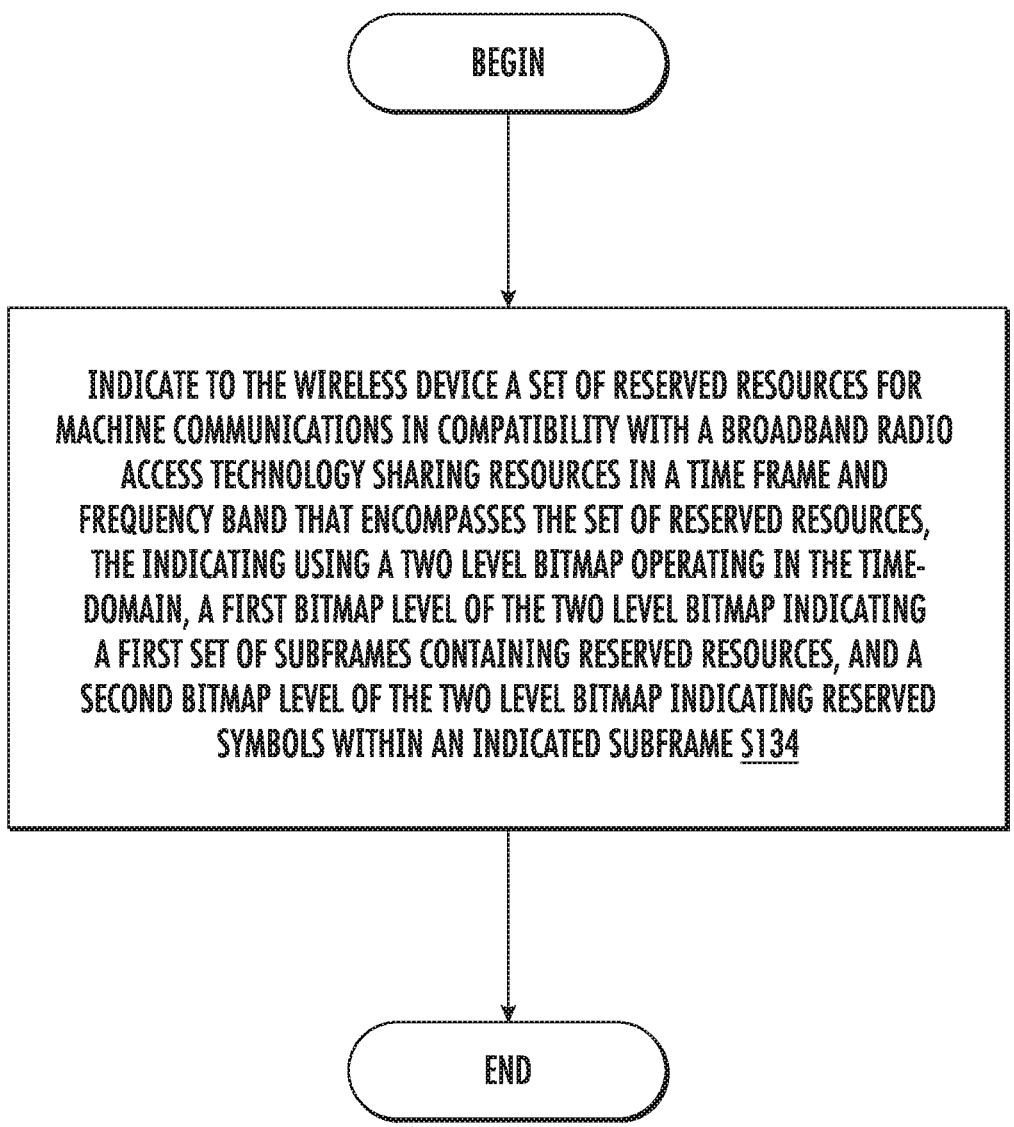
FIG. 10 is a flowchart of an exemplary process in a network node for Long term Evolution-Machine type (LTE-M) resource reservation using a bitmap according to some embodiments of the present disclosure.

FIG. 10 is a flowchart of an exemplary process in a network node 16 according to some embodiments disclosed herein. One or more blocks described herein may be performed by one or more elements of network node 16 such as by one or more of processing circuitry 68 (including the reservation unit 32), processor 70, radio interface 62 and/or communication interface 60. Network node 16 such as via processing circuitry 68 and/or processor 70 and/or radio interface 62 and/or communication interface 60 is configured to indicate a set of reserved resources for machine communications in compatibility with a broadband radio access technology sharing resources in a time frame and frequency band that encompasses the set of reserved resources, the indicating using a two level bitmap, a first bitmap level of the two level bitmap indicating a first set of subframes, and a second bitmap level of the two level bitmap indicating one of reserved symbols and reserved slots within an indicated subframe, the indicated one of reserved symbols and reserved slots being indicated as valid (Block S134).

Having described the general process flow of arrangements of the disclosure and having provided examples of hardware and software arrangements for implementing the processes and functions of the disclosure, the sections below provide details and examples of arrangements for Long term Evolution-Machine type (LTE-M) resource reservation using a bitmap.

Figure 11:
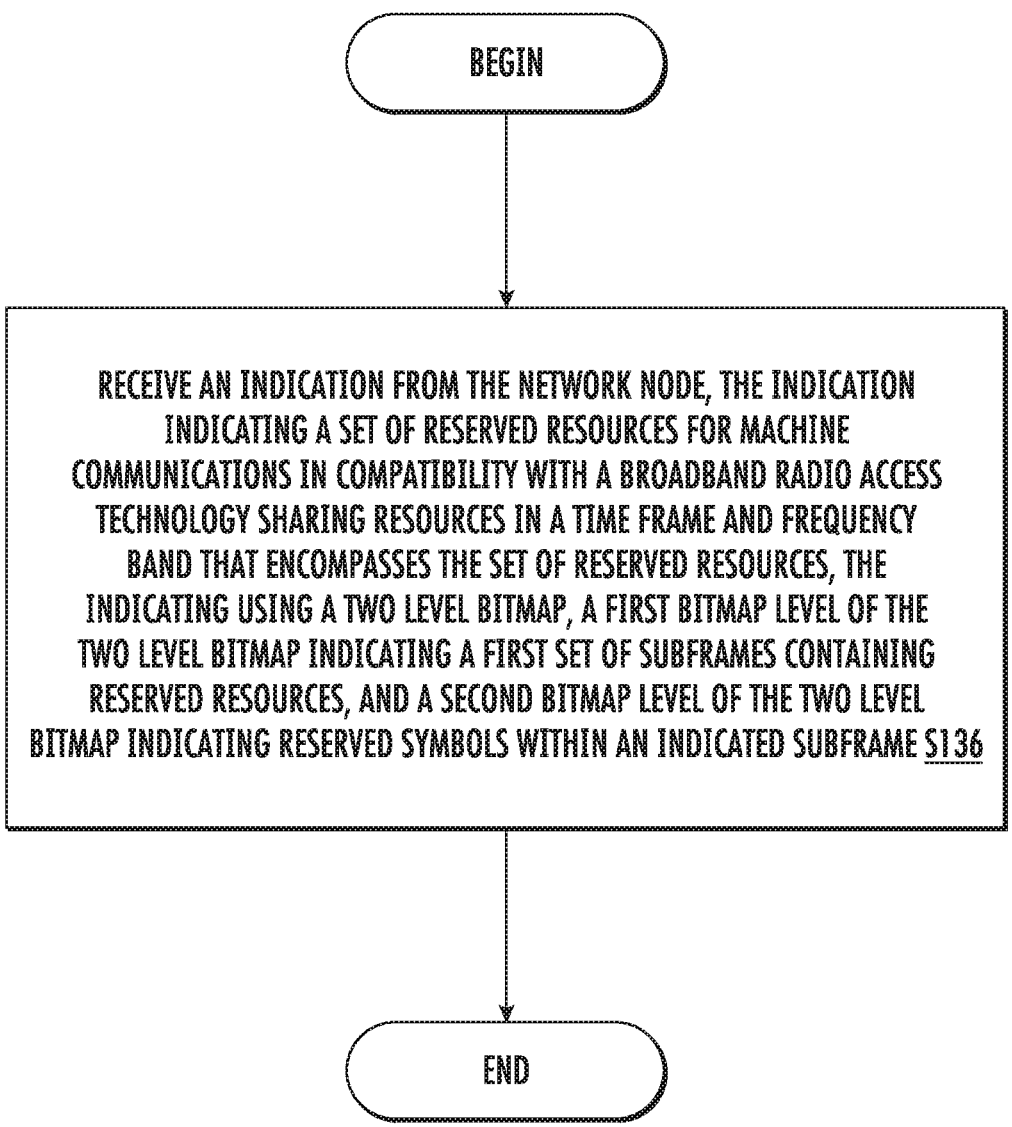
FIG. 11 is a flowchart of an example process in a WD for Long term Evolution-Machine type (LTE-M) resource reservation using a bitmap according to some embodiments of the present disclosure.

A flexible way to indicate reserved resources in LTE-M is to use a set of bitmaps. In particular, a bitmap with a specific length can point to time-domain resources (symbols, slots, or subframes) which should not be used by LTE-M WDs 22 (an illustrative example is shown in FIG. 11). In the current LTE-M system there are bitmaps of length 10 or 40 bits that can be used for indicating valid/invalid subframes in downlink and/or uplink within one or four frames.

For this purpose, higher layer parameters fdd-DownlinkOrTddSubframeBitmapBR or fdd-UplinkSubframeBitmapBR can be used. Alternatively, for the downlink, the bitmap indicating the pattern of valid subframes may be given by the parameter MBSFN-SubframeConfig. As discussed, a smaller resource reservation granularity in LTE-M improves the performance of NR/LTE-M coexistence.

In order to configure slot-level or symbol-level LTE-M resource reservation, some embodiments include a two-level bitmap (bitmap level 1 and bitmap level 2, not to be confused with the NR resource reservation parameters bitmap 1 and bitmap 2 described earlier) operating in the time domain, in which bitmap level 1 indicates a subset of subframes and bitmap level 2 shows the reserved symbols within those subframes identified by bitmap level 1.

Figure 12:
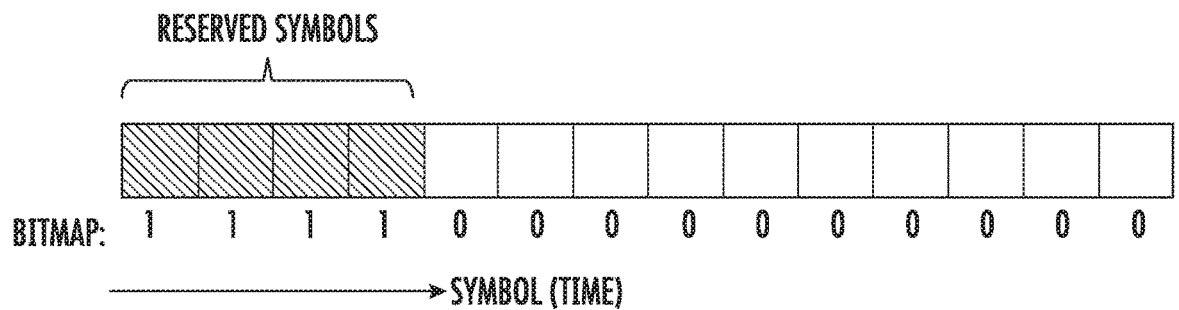
FIG. 12 is a diagram of an example bit map with reserved symbols.
Figure 13:
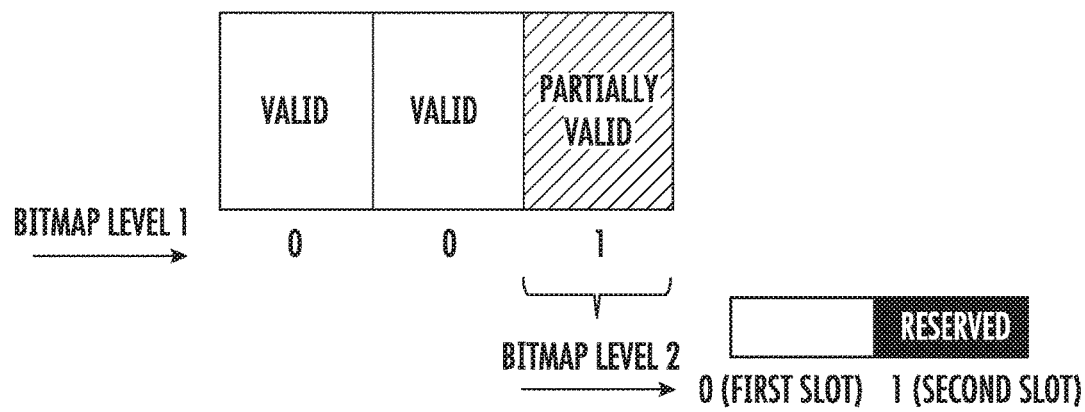
FIG. 13 is an example diagram illustrating a two level bit map.

For example, in bitmap level 1, a "0" indicates a subframe which is fully available (valid) for LTE-M, and a "1" refers to a subframe which is not fully available (or partially valid) for LTE-M (i.e., some of the symbols within this subframe are reserved). Then, bitmap level 2 can be used only for those partially valid subframes to indicate which symbols are reserved. As an example, FIG. 12 shows the slot-level resource reservation using two-level bitmap. In this figure, the second slot of the partially valid is reserved.

In general, the granularity of the second level resource reservation can be one OFDM symbol, two symbols, seven symbols, or 14 symbols. The one-symbol granularity may be the smallest granularity, the seven-symbol granularity may be slot-level, and 14-symbol granularity may be the existing subframe-level resource reservation.

The overhead of resource reservation may depend on the bitmap length which itself depends on the granularity. Table 1 lists the length of bitmap 1 and bitmap 2 in some embodiments showing the two-level bitmap resource reservation method described herein.

TABLE 1

Bitmap length for various granularities of LTE-M resource reservation (two-level bitmap case).

| Granularity of resource reservation | Bitmap 1 length | Bitmap 2 length for each partially valid subframe |
|---|---|---|
| One OFDM symbol | 10 (within one frame), or 40 (within four frames) | 14 |
| Two OFDM symbols | 10 (within one frame), or 40 (within four frames) | 7 |
| Seven OFDM symbol (slot-level) | 10 (within one frame), or 40 (within four frames) | 2 |
| Subframe-level (14 OFDM symbols) | 10 (within one frame), or 40 (within four frames) | No need for bitmap 2 |

Given the resource reservation schemes described, at least the following embodiments are set forth:

In one embodiment, a two-level bitmap may be used, such as by the network node 16, to indicate the set of reserved LTE-M resources.

In another embodiment, symbol-level, slot-level, or subframe-level resource reservation can be configured.

In another embodiment, in the two-level bitmap, bitmap level 1 indicates the subframes and bitmap level 2 shows the reserved symbols within those subframes identified by the first bitmap.

In another embodiment, bitmap level 1 indicates whether each subframe is fully available (valid) or partially available (partially valid) for LTE-M. In another embodiment, bitmap level 2 can determine reserved symbols within each partially valid subframe identified by bitmap level 1. In another embodiment, the granularity of resource reservation is determined based on the overhead of bitmaps.

In one embodiment, multiple pairs of two-level bitmaps are defined, where in each pair, bitmap level 1 indicates a subset of subframes and the bitmap level 2 in each pair uses a different granularity. Each pair may use a bitmap level 1 of the same or different lengths. The subset of subframes indicated by bitmap level 1 of the different pairs may only be allowed to be non-overlapping. Configuration of overlapping subframes of bitmap level 1 from different pairs is an invalid configuration.

In a related embodiment, one two-level bitmap is combined with a bitmap representing subframe-level resource reservation, such as an existing bitmap for signaling valid/invalid subframes, for example fdd-DownlinkOrTddSubframeBitmapBR. This way, it is possible to signal that a particular subframe is "fully valid", "partially valid" and "invalid". The same functionality can be achieved by jointly encoding the bitmaps, thereby optimizing the number of bits needed to be signaled. In one such embodiment, the length of bitmap level 1 is reduced from its original size (e.g. 10 or 40 as indicated above), to a length equal to the number of subframes indicated as valid, e.g., by an existing bitmap such as fdd-DownlinkOrTddSubframeBitmapBR.

In partially available subframes, the WD 22 may assume that LTE-M transmission takes place in the non-reserved resources.

In yet another embodiment, a third bitmap, bitmap level 3, operates on an RB level in the frequency domain. The third bitmap can be used to make resources available outside a certain frequency band, i.e., a band containing the SSB. Hence, when bitmap level 1 and 2 reserve resources in the time domain, i.e., in certain symbols in some subframes, this is then combined with bitmap level 3 information which has the length equal to the number of RBs. If bitmap level 1 and bitmap level 2 indicate that a symbol is reserved, then that symbol is only reserved for those RBs as indicated by bitmap level 3. If bitmap level 3 indicates that an RB is valid, then that RB is valid for all symbols in all subframes, without regard to the information in bitmap level 1 and bitmap level 2. This can be used to protect NR SSB and NR CORESET from LTE-M collisions.

According to one aspect, a network node 16 configured to communicate with a wireless device (WD) 22 is provided. The network node 16 includes processing circuitry 68 configured to indicate to the wireless device 22 a set of reserved resources for machine communications in compatibility with a broadband radio access technology sharing resources in a time frame and frequency band that encompasses the set of reserved resources, the indicating using a two level bitmap operating in the time-domain, a first bitmap level of the two level bitmap indicating a first set of subframes containing reserved resources, and a second bitmap level of the two level bitmap indicating reserved symbols within an indicated subframe.

According to this aspect, in some embodiments, the indicated reserved resources are not used for Long Term Evolution Machine Communications, LTE-M, transmissions. In some embodiments, resources not indicated as reserved resources may be used by for LTE-M transmissions. In some embodiments, the processing circuitry 68 is further configured to indicate to the wireless device a set resource blocks using a third bitmap, the third bitmap indicating for which resource blocks in frequency domain the time-domain resource reservation indicated by the two level bitmap applies. In some embodiments, the first bitmap level of the two level bitmap indicates whether a subframe is available or partially available for Long Term Evolution Machine Communications, LTE-M. In some embodiments, the broadband radio access technology is New Radio, NR. In some embodiments, a granularity of a resource reservation is based on an overhead of bitmaps. In some embodiments, the granularity is one of one symbol, two symbols, seven symbols and 14 symbols. In some embodiments, the processing circuitry 68 is further configured to define multiple pairs of two-level bitmaps, within each pair, the first bitmap level of the two level bitmap indicating a subset of subframes and the second bitmap level of the two level bitmap indicating a granularity of resource reservation. In some embodiments, the second bitmap level of a first pair of two-level bitmaps is of indicates a resource reservation granularity that is different from a second bitmap level of a second pair of two-level bitmaps. In some embodiments, a first subset of subframes indicated by the first bitmap level of a first pair of two-level bitmaps and a second subset of frames indicated by the first bitmap level of a second pair of two-level bitmaps do not overlap. In some embodiments, the processing circuitry 68 is further configured to introduce a third two-level bitmap configurable to make resources available outside the frequency band. In some embodiments, the processing circuitry is further configured to jointly encode a bitmap indicated by the first bitmap level of the two level bitmap with a bitmap indicating that a particular subframe indicated by the first bitmap level of the two level bitmap is fully valid, partially valid or invalid.

According to another aspect, a method in a network node 16 configured to communicate with a wireless device (WD) 22 is provided. The method includes indicating, via the processing circuitry 68, to the wireless device a set of reserved resources for machine communications in compatibility with a broadband radio access technology sharing resources in a time frame and frequency band that encompasses the set of reserved resources, the indicating using a two level bitmap operating in the time-domain, a first bitmap level of the two level bitmap indicating a first set of subframes containing reserved resources, and a second bitmap level of the two level bitmap indicating reserved symbols within an indicated subframe.

According to this aspect, in some embodiments, the indicated reserved resources are not used for Long Term Evolution Machine Communications, LTE-M, transmissions. In some embodiments, resources not indicated as reserved resources may be used by for LTE-M transmissions. In some embodiments, the method further includes indicating to the wireless device a set resource blocks using a third bitmap, the third bitmap indicating for which resource blocks in frequency domain the time-domain resource reservation indicated by the two level bitmap applies. In some embodiments, the first bitmap level of the two level bitmap indicates whether a subframe is available or partially available for Long Term Evolution Machine Communications, LTE-M. In some embodiments, the broadband radio access technology is New Radio, NR. In some embodiments, a granularity of a resource reservation is based on an overhead of bitmaps. In some embodiments, the granularity is one of one symbol, two symbols, seven symbols and 14 symbols. In some embodiments, the method further includes defining multiple pairs of two-level bitmaps, within each pair, the first bitmap level of the two level bitmap indicating a subset of subframes and the second bitmap level of the two level bitmap indicating a granularity of resource reservation. In some embodiments, the second bitmap level of a first pair of two-level bitmaps is of indicates a resource reservation granularity that is different from a second bitmap level of a second pair of two-level bitmaps. In some embodiments, a first subset of subframes indicated by the first bitmap level of a first pair of two-level bitmaps and a second subset of frames indicated by the first bitmap level of a second pair of two-level bitmaps do not overlap. In some embodiments, the method includes introducing a third two-level bitmap configurable to make resources available outside the frequency band. In some embodiments, the method includes jointly encoding a bitmap indicated by the first bitmap level of the two level bitmap with a bitmap indicating that a particular subframe indicated by the first bitmap level of the two level bitmap is fully valid, partially valid or invalid.

According to another aspect, a WD 22 is configured to communicate with a network node 16. The wireless device 22 includes processing circuitry 84 configured to receive an indication from the network node, the indication indicating a set of reserved resources for machine communications in compatibility with a broadband radio access technology sharing resources in a time frame and frequency band that encompasses the set of reserved resources, the indicating using a two level bitmap, a first bitmap level of the two level bitmap indicating a first set of subframes containing reserved resources, and a second bitmap level of the two level bitmap indicating reserved symbols within an indicated subframe.

According to this aspect, in some embodiments, the indicated reserved resources are not used for Long Term Evolution Machine Communications, LTE-M, transmissions. In some embodiments, resources not indicated as reserved resources may be used by for LTE-M transmissions. In some embodiments, the first bitmap level of the two level bitmap indicates whether a subframe is available or partially available for Long Term Evolution Machine Communications, LTE-M. In some embodiments, the processing circuitry (68) is further configured to indicate to the wireless device a set resource blocks using a third bitmap, the third bitmap indicating for which resource blocks in frequency domain the time-domain resource reservation indicated by the two level bitmap applies. In some embodiments, a granularity of a resource reservation is based on an overhead of bitmaps. In some embodiments, the processing circuitry is further configured to define multiple pairs of two-level bitmaps, within each pair, the first bitmap level of the two level bitmap indicating a subset of subframes and the second bitmap level of the two level bitmap indicating a granularity of resource reservation. In some embodiments, the second bitmap level of a first pair of two-level bitmaps is of indicates a resource reservation granularity that is different from a second bitmap level of a second pair of two-level bitmaps. In some embodiments, a first subset of subframes indicated by the first bitmap level of a first pair of two-level bitmaps and a second subset of frames indicated by the first bitmap level of a second pair of two-level bitmaps do not overlap. In some embodiments, the processing circuitry is further configured to jointly encode a bitmap indicated by the first bitmap level of the two level bitmap with a bitmap indicating that a particular subframe indicated by the first bitmap level of the two level bitmap is fully valid, partially valid or invalid.

According to yet another aspect, a method in a WD 22 includes receiving an indication from the network node 16, the indication indicating a set of reserved resources for machine communications in compatibility with a broadband radio access technology sharing resources in a time frame and frequency band that encompasses the set of reserved resources, the indicating using a two level bitmap, a first bitmap level of the two level bitmap indicating a first set of subframes containing reserved resources, and a second bitmap level of the two level bitmap indicating reserved symbols within an indicated subframe.

According to this aspect, in some embodiments, the indicated reserved resources are not used for Long Term Evolution Machine Communications, LTE-M, transmissions. In some embodiments, resources not indicated as reserved resources may be used by for LTE-M transmissions. In some embodiments, the first bitmap level of the two level bitmap indicates whether a subframe is available or partially available for Long Term Evolution Machine Communications, LTE-M. In some embodiments, the method further includes indicating to the wireless device a set resource blocks using a third bitmap, the third bitmap indicating for which resource blocks in frequency domain the time-domain resource reservation indicated by the two level bitmap applies. In some embodiments, a granularity of a resource reservation is based on an overhead of bitmaps. In some embodiments, the method includes defining multiple pairs of two-level bitmaps, within each pair, the first bitmap level of the two level bitmap indicating a subset of subframes and the second bitmap level of the two level bitmap indicating a granularity of resource reservation. In some embodiments, the second bitmap level of a first pair of two-level bitmaps is of indicates a resource reservation granularity that is different from a second bitmap level of a second pair of two-level bitmaps.

Some embodiments include:

Embodiment A1. A network node configured to communicate with a wireless device (WD), the network node configured to, and/or comprising a radio interface and/or comprising processing circuitry configured to:
   indicate a set of reserved Long Term Evolution machine type, LTE-M, resources using a two level bitmap, a first bitmap level indicating a first set of subframes and a second bitmap level indicating reserved symbols within an indicated subframe.

Embodiment A2. The network node of Embodiment A1, wherein the first bitmap level indicates whether a subframe is available or partially available for LTE-M.

Embodiment A3. The network node of Embodiment A1, wherein a granularity of a resource reservation is based on an overhead of bitmaps.

Embodiment A4. The network node of any of Embodiments A1-A3, wherein the network node and/or the radio interface and/or the processing circuitry is further configured to define multiple pairs of two-level bitmaps, within each pair, the first bitmap level indicates a subset of subframes and the second bitmap level uses a different granularity.

Embodiment A5. The network node of any of Embodiments A1-A4, wherein the network node and/or the radio interface and/or the processing circuitry is further configured to introduce a third bitmap level configurable to make resources available outside a frequency band.

Embodiment B1. A method implemented in a network node, the method comprising:
   indicating a set of reserved Long Term Evolution machine type, LTE-M, resources using a two level bitmap, a first bitmap level indicating a first set of subframes and a second bitmap level indicating reserved symbols within an indicated subframe.

Embodiment B2. The method of Embodiment B1, wherein the first bitmap level indicates whether a subframe is available or partially available for LTE-M.

Embodiment B3. The method of Embodiment B1, wherein a granularity of a resource reservation is based on an overhead of bitmaps.

Embodiment B4. The method of any of Embodiments B1-B3, further comprising defining multiple pairs of two-level bitmaps, within each pair, the first bitmap level indicates a subset of subframes and the second bitmap level uses a different granularity.

Embodiment B5. The method of any of Embodiments B1-B4, further comprising introducing a third bitmap level configurable to make resources available outside a frequency band.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C"

programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| 3GPP | 3rd Generation Partnership Project |
| CORESET | Control Resource Set |
| CRS | Cell-specific Reference Signal |
| CSI-RS | Channel State Information Reference Signal |
| DL | Downlink |
| eNB | Evolved Node B |
| IoT | Internet of Things |
| LTE | Long-Term Evolution |
| LTE-M | Long-Term Evolution for Machine-Type Communications |
| LTE-MTC | Long-Term Evolution for Machine-Type Communications |
| MBSFN | Multicast Service Single Frequency Network |
| NR | New Radio |
| NSSS | Narrowband Secondary Synchronization Signal |
| PBCH | Physical Broadcast Channel |
| PRB | Physical Resource Block |
| PSS | Primary Synchronization Signal |
| SSB | Synchronization Signal Block |
| SSS | Secondary Synchronization Signal |
| TDD | Time Division Duplex |
| TRS | Tracking Reference Signal |
| UE | User Equipment |
| UL | Uplink |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device (WD), the network node comprising processing circuitry configured to:
   indicate to the wireless device a set of reserved resources for machine communications in compatibility with a broadband radio access technology sharing resources in a time frame and frequency band that encompasses the set of reserved resources, the indicating using a two level bitmap operating in the time-domain, a first bitmap level of the two level bitmap indicating a first set of subframes containing reserved resources, and a second bitmap level of the two level bitmap indicating reserved symbols within an indicated subframe, wherein the first bitmap level of the two level bitmap indicates whether a subframe is available or partially available for Long Term Evolution Machine Communications (LTE-M).

2. The network node of claim 1, wherein the indicated reserved resources are unused for Long Term Evolution Machine Communications (LTE-M) transmissions.

3. The network node of claim 1, wherein resources not indicated as reserved resources are used for LTE-M transmissions.

4. The network node of claim 1, wherein the processing circuitry is further configured to indicate to the wireless device a set resource blocks using a third bitmap, the third bitmap indicating for which resource blocks in frequency domain the time-domain resource reservation indicated by the two level bitmap applies.

5. The network node of claim 1, wherein a granularity of a resource reservation is based on an overhead of bitmaps.

6. The network node of claim 1, wherein the processing circuitry is further configured to define multiple pairs of two-level bitmaps, within each pair, the first bitmap level of the two level bitmap indicating a subset of subframes and the second bitmap level of the two level bitmap indicating a granularity of resource reservation.

7. The network node of claim 5, wherein the second bitmap level of a first pair of two-level bitmaps is of indicates a resource reservation granularity that is different from a second bitmap level of a second pair of two-level bitmaps.

8. The network node of claim 5, wherein a first subset of subframes indicated by the first bitmap level of a first pair of two-level bitmaps and a second subset of frames indicated by the first bitmap level of a second pair of two-level bitmaps do not overlap.

9. The network node of claim 1, wherein the processing circuitry is further configured to jointly encode a bitmap indicated by the first bitmap level of the two level bitmap with a bitmap indicating that a particular subframe indicated by the first bitmap level of the two level bitmap is fully valid, partially valid or invalid.

10. A method in a network node configured to communicate with a wireless device (WD), the method comprising:
   indicating to the wireless device a set of reserved resources for machine communications in compatibility with a broadband radio access technology sharing resources in a time frame and frequency band that encompasses the set of reserved resources, the indicating using a two level bitmap operating in the time-domain, a first bitmap level of the two level bitmap indicating a first set of subframes containing reserved resources, and a second bitmap level of the two level bitmap indicating reserved symbols within an indicated subframe, wherein the first bitmap level of the two level bitmap indicates whether a subframe is available or partially available for Long Term Evolution Machine Communications (LTE-M).

11. The method of claim 10, wherein the indicated reserved resources are unused for Long Term Evolution Machine Communications (LTE-M) transmissions.

12. The method of claim 10, wherein resources not indicated as reserved resources are used for LTE-M transmissions.

13. The method of claim 10, further comprising indicating to the wireless device a set resource blocks using a third bitmap, the third bitmap indicating for which resource blocks in frequency domain the time-domain resource reservation indicated by the two level bitmap applies.

14. The method of claim 10, wherein a granularity of a resource reservation is based on an overhead of bitmaps.

15. The method of claim 10, further comprising defining multiple pairs of two-level bitmaps, within each pair, the first bitmap level of the two level bitmap indicating a subset of subframes and the second bitmap level of the two level bitmap indicating a granularity of resource reservation.

16. The method of claim 14, wherein the second bitmap level of a first pair of two-level bitmaps is of indicates a resource reservation granularity that is different from a second bitmap level of a second pair of two-level bitmaps.

17. The method of claim 14, wherein a first subset of subframes indicated by the first bitmap level of a first pair of two-level bitmaps and a second subset of frames indicated by the first bitmap level of a second pair of two-level bitmaps do not overlap.

18. The method of claim 10, further comprising jointly encoding a bitmap indicated by the first bitmap level of the two level bitmap with a bitmap indicating that a particular subframe indicated by the first bitmap level of the two level bitmap is fully valid, partially valid or invalid.

19. A wireless device (WD) configured to communicate with a network node, the wireless device comprising processing circuitry configured to:
receive an indication from the network node, the indication indicating a set of reserved resources for machine communications in compatibility with a broadband radio access technology sharing resources in a time frame and frequency band that encompasses the set of reserved resources, the indicating using a two level bitmap, a first bitmap level of the two level bitmap indicating a first set of subframes containing reserved resources, and a second bitmap level of the two level bitmap indicating reserved symbols within an indicated subframe, wherein the first bitmap level of the two level bitmap indicates whether a subframe is available or partially available for Long Term Evolution Machine Communications (LTE-M).

20. A method in a wireless device (WD), the method comprising:
receiving an indication from the network node, the indication indicating a set of reserved resources for machine communications in compatibility with a broadband radio access technology sharing resources in a time frame and frequency band that encompasses the set of reserved resources, the indicating using a two level bitmap, a first bitmap level of the two level bitmap indicating a first set of subframes containing reserved resources, and a second bitmap level of the two level bitmap indicating reserved symbols within an indicated subframe, wherein the first bitmap level of the two level bitmap indicates whether a subframe is available or partially available for Long Term Evolution Machine Communications (LTE-M).

* * * * *